Nov. 13, 1934.  C. K. KNIGHT  1,980,590
WINDSHIELD CLEANER
Filed Dec. 19, 1928  2 Sheets-Sheet 1
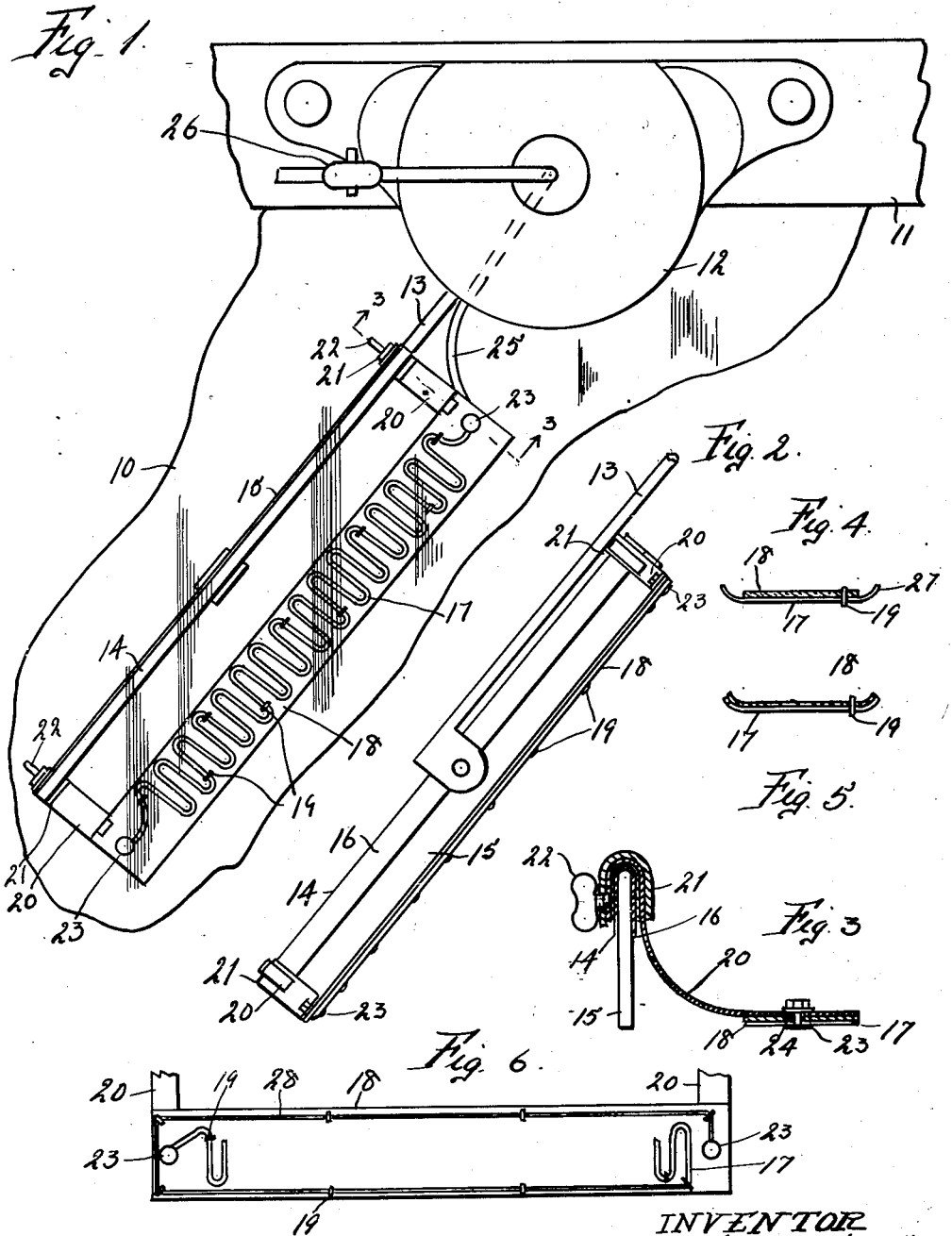

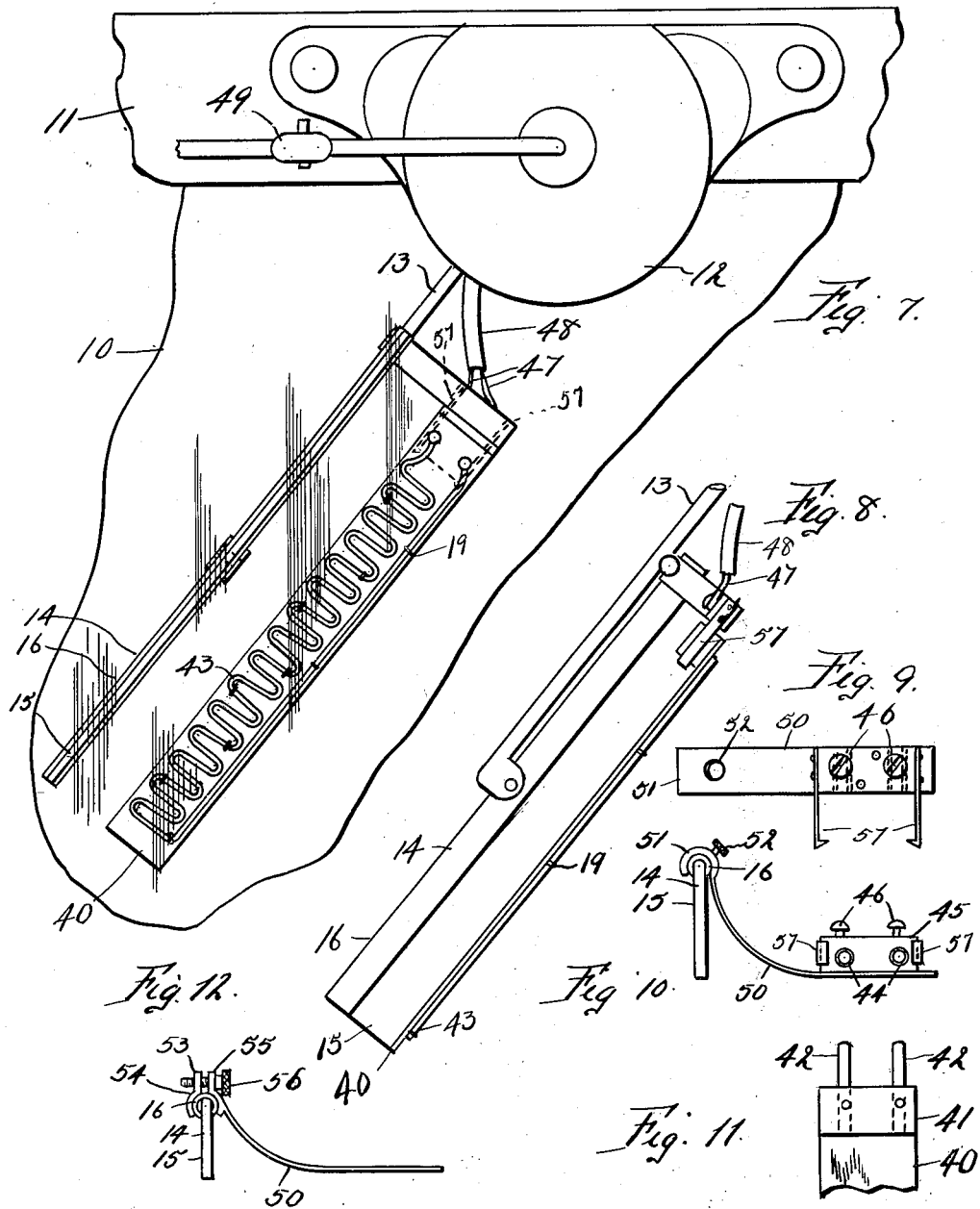

Patented Nov. 13, 1934

1,980,590

UNITED STATES PATENT OFFICE 1,980,590

WINDSHIELD CLEANER

Charles Kelley Knight, Upper Darby, Pa.

Application December 19, 1928, Serial No. 326,978

1 Claim. (Cl. 219—19)

My invention relates to new and useful improvements in a wind shield cleaner and more particularly to an attachment for the ordinary wind shield cleaner or squeegee whereby ice formation, such as sleet and snow may be melted and removed from the wind shield of an automobile or other vehicle. It might be well to state at this time that wherever "wind shield" is referred to, such terms are also to include any window of any vehicle.

Other wind shield cleaners which are intended to remove ice and snow from wind shields include large opaque housings or coverings for the heating unit which obscure the vision of the operator of a vehicle, and have sharp or abrupt corners, which tend to catch on or contact with the lumpy ice formation in such manner as to prevent the proper operation of the wipers. Where helical heating coils are used, which contact only tangentially with the ice, snow, etc., the lumps or rough formation of ice are not readily removed and such devices are, at best, thermally very inefficient, particularly because of the small amount of surface of the heating element which contacts with the ice formation.

A particular objection to the known forms of heating devices for wind shield cleaners is the non-adjustability of the heating element or its container so that when in place for operation, the housing of the heating element will either press against the wind shield so hard as to push the squeegee out of its proper position or create such an amount of friction that the cleaner becomes practically inoperative or the heating element will be maintained at an ineffective distance from the wind shield so that the ice formations will not be melted and off-times the squeegee will have no cleaning action.

Again, the housings for the heating element are often of heat insulating material so that ice will form directly upon the housings or snow will build up thereon, adding so much weight that the cleaner will not function properly or at all and the accumulation of ice and snow thereon will further obstruct the vision of the vehicle operator.

With the above and other considerations in mind, it is proposed, in accordance with the present invention, to provide a unitary auxiliary or attachment to modern wind shield wipers which will be exceedingly simple in construction, light in weight, flexible, yet having sufficient rigidity to maintain the heating element in contact with ice formations, transparent so as not to obstruct the vision of the operator of a vehicle, the material of the heating element support being such that ice, under ordinary conditions, will not form thereon and the complete auxiliary or attachment being provided with means for removably mounting it upon an ordinary wind shield cleaner without the use of tools.

One of the principal objects of the invention is to provide effective and convenient means, attachable to an ordinary wind shield cleaner, for removing ice, sleet, snow and the like from the wind shields of automobiles and other vehicles which means will not affect, to any appreciable extent, the operator's vision of the road or right of way in front of him.

Another object of the invention is to provide a device of the kind mentioned having a transparent support for the heating element which, with its component parts, may be readily attached to or removed from the ordinary wind shield wiper since it is of no use or is not needed when ice or snow is not forming on the wind shield.

Another object of the invention is to provide an attachment or auxiliary for a wind shield wiper which will have a certain amount of flexibility and which may also have certain curvatures so that the heating element will contact with different rough formations of ice and assist it in sliding over lumpy formations, thus eliminating the possibility of stalling the wiper.

Another object of the invention is to provide a device of this kind which will be exceedingly light in weight so as not to reduce the speed of, or stop, the wiper when in operation.

Another object of the invention is to provide an auxiliary or attachment for a wind shield wiper whereby uninsulated electrically heated wires will actually contact with the ice formations on a wind shield so that when in motion, the major part of the circumference of a wire forming the heating element throughout its entire length will engage the ice and strike the sides of lumpy formations so as to readily melt through and remove the same.

A further object of the invention is to provide a heating attachment for wind shield cleaners so constructed that the heating element may be adjusted relative to the surface of the wind shield independent of the squeegee whereby the proper degree of pressure of the heating element upon the wind shield or the ice and snow formations thereon may be maintained, which degree of pressure, to be effective, should be substantially the same as that exerted by the squeegee upon the wind shield.

A still further object of the invention is to provide a support for the heating element of very thin material and having heat conducting qualities so as to prevent the formation of ice or the lodging of snow upon said support.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings, forming a part of this application, in which:—

Fig. 1 is a fragmentary elevation of the rear face of a wind shield showing a wind shield cleaner of ordinary or usual construction provided with my improved attachment or auxiliary heating device connected therewith.

Fig. 2 is a side elevation of the wind shield wiper or squeegee with a portion of its arm connected thereto and illustrating the relation of the heating unit which is detachably mounted thereon.

Fig. 3 is an enlarged sectional view of the squeegee and the heating attachment or auxiliary along the line 3—3 of Fig. 1.

Fig. 4 is an enlarged transverse sectional view of the heating attachment and its support illustrating a modified construction.

Fig. 5 is a similar view of another formation.

Fig. 6 is a rear face view of the heating device showing a further modification with the ends of the arms broken away.

Fig. 7 is a fragmentary elevation of the rear face of a wind shield showing a slightly modified form of heating attachment or auxiliary connected with the wind shield wiper by a single arm.

Fig. 8 is a side elevation of this form of the heating attachment and a portion of the wind shield wiper.

Fig. 9 is an enlarged plan view of the arm and its component parts.

Fig. 10 is an end view thereof showing it connected to the squeegee portion of the wind shield wiper.

Fig. 11 is an enlarged fragmentary plan view of the heating attachment showing the terminals by which it is mechanically and electrically connected with the supporting arm.

Fig. 12 is an end view of the supporting arm and the squeegee portion of the wind shield wiper illustrating another form of clamp and with the socket member removed from said arm.

In carrying out my invention as herein embodied, particular reference being had to Figs. 1, 2 and 3, the reference numeral 10 represents the glass portion of an automobile wind shield which is suitably glazed in a frame 11, the top rail of which is herein illustrated.

On such frame 11 is generally mounted the actuating portion 12 of a wind shield cleaner or wiper and said actuating portion or mechanism may be an electrically, vacuum, manually or otherwise operated device to which is connected an arm 13 for oscillation or reciprocation across the front face of the transparent or glass portion of the wind shield and said arm carries a wiper 15 of rubber or other suitable material and a metal backing 16, usually of channel formation in which the squeegee is secured and said squeegee is adapted to wipe the accumulations of moisture and very light deposits of snow and possibly very thin formations of ice from the surface of the glass over which said squeegee is moved.

During sleet storms or when the weather conditions are such that rain falling upon a wind shield glass will freeze, the vision of the operator of a vehicle is obscured, thus practically preventing operation of the vehicle unless the wind shield or other window is opened, because the usual wiper has absolutely no effect in preventing the formation of accumulations of ice or the removal of such accumulations. I have found that the accumulations of ice in the path of travel of the wiper can be melted or melted to such an extent that it practically breaks up the ice and loosens it from the glass, then the resulting ice particles or moisture can be wiped aside.

I have also found that under most conditions, it is necessary to provide an extended heating surface and that the heating element must be in contact with the ice to be effective so that there must be sufficient rigidity in the device to hold it against the wind shield and at the same time sufficient inherent resiliency to allow the heating element to pass over lumpy ice formations projecting from the surface of the wind shield.

My method of applying the necessary heat to melt the ice from the glass is to produce a flat heating element 17, composed of a suitable length of small uncovered wire bent back and forth upon itself in the same continuous plane as shown in Fig. 1, thus providing an extended effective area without greatly obscuring or affecting the driver's vision.

The heating element thus formed is mounted upon, fixed to or carried by a transparent support 18 of mica or an equivalent or analogous material and said support may be likened to a thin panel or sheet preferably rectangular although the particular shape is immaterial.

For convenience of illustration, I have shown the heating element 17 fastened at several points to the support, by means of tie wires or staples 19 and since the mica is a non-conductor of electricity, such fasteners will have no effect or no tendency to short-circuit the current.

The heating device including the heating element and its support has one or more arms 20 attached thereto, said arms to be made of suitable metal having a certain amount of resiliency and flexibility so that they may be bent for adjusting purposes and after the desired adjustment is obtained, the resiliency thereof will permit the heating device to slide over obstructions while remaining in contact therewith and said arms are provided with sockets 21 which fit over the squeegee, and more particularly the metal back thereof where they may be held by thumb nuts 22 having threaded connection with the sockets so as to impinge against the cleaning element.

Arms 20 may be fastened to the heating device by very thin-headed screws 23, rivets or their equivalent and such fastening devices may be utilized as binding posts in which case they are connected with the ends of the wire forming the heating device.

The electrical current may be conducted to the heating element in any desirable or well-known manner, as for instance, arms 20 may be insulated from the metallic back of the cleaner and the necessary conductors connected with the binding posts 23, as shown in Fig. 3, or one of the binding posts may be insulated from the arm with which it is associated by means of an insulating sleeve and washers, all designated by the numeral 24 and to the binding post or fastening 23 thus insulated, is secured one end of the usual single conductor 25 leading from a source of electrical energy.

The other binding post or fastening is electrically connected with its arm so as to return the current through the associated arm, the metallic back of the cleaner, the wiper arm 13 and the frame of the vehicle. The conductor 25 may be provided with a suitable switch 26 for conveniently turning the supply of current on and off the heating element.

The support for the heating element being of mica or other similar suitable transparent material, the view of an operator of a vehicle equipped with such a device will not be obstructed to any great degree and the support is so thin that the temperature thereof will be raised sufficiently to prevent the formation of ice thereon.

Another method of connecting the heater attachment or auxiliary to a wind shield wiper is illustrated in Figs. 7 and 8 wherein the support 40 is similar to that shown and described in connection with the other form, but in this instance, a block of insulating material 41 is mounted at one end of said support and provided with terminals 42 to which the ends of the uninsulated wire heating element 43 are connected, it being understood that said heating element is similar to the one previously described.

The terminals 42 are removably mounted in sockets 44 fitted in an insulating block 45 provided with binding posts 46 for the wires 47 of a two-wire cable 48. The wires are connected with any suitable source of electrical energy and a switch 49 is provided for conveniently turning on and off the current to the heating element.

The insulating block 45 carrying the sockets 44 is mounted upon a flexible supporting arm 50 at the outer end of which is a clamp 51 of any desirable construction.

The clamp illustrated in Figs. 6 to 10 inclusive is of such shape that it surrounds more than one-half of the metal back 16 of the wiper and therefore can be rotated on said back or moved lengthwise thereof, but no other way so that to put the supporting arm and its component parts on the wiper or remove it therefrom, said clamp is slid lengthwise of the wiper. By rotating said clamp, the outer end of the supporting arm, therefore the heater, when carried thereby can be moved to and from the wind shield within certain limitations. After the desired adjustment is obtained, the parts can be held in place by a hand-operated set screw 52.

The clamp 21 shown in connection with Figs. 1, 2 and 3 has a lateral adjustment relative to the cleaning element which enables the operator to adjust the heating element relative to the wind shield for the same purpose that the clamp shown in Fig. 10 is rotated.

In lieu of either of these clamps, one, such as shown in Fig. 12 and designated by the numeral 53 can be used. Such a clamp includes two jaws 54 and 55 with a thumb screw 56 passing through one and having threaded connection with the other for drawing them together about an object, such as the metal back 16 of the wiper 14, and as in the other forms of the invention, such a clamp is formed with or carried by one or all the arms of the heater attachment, and in this particular instance, the arm 50 is illustrated without the socket bearing block.

After the heating element has been connected with the arm, as by inserting the terminals 42 in the sockets 44, it may be held against accidental displacement by any suitable devices, and for convenience of illustration I have shown a pair of spring catches 57 which snap behind the insulating block 41 when the heating device is properly mounted on the supporting arm.

The support being flexible, it can readily ride over obstructions exemplified by the rough formation of ice and yet it is sufficiently rigid to constantly hold the heating element in contact with the ice, or the face of the wind shield, so as to readily melt ice or snow and reduce it to water which may be then wiped to one side or the other by the squeegee. Further, the clamping arrangement permits the heating device to be readily attached to or detached from the wiper or cleaner and because of the resilient but flexible arms, the heater may be held against the wind shield under proper pressure after the desired adjustment has been obtained. To obtain the same results, the supporting arms may be hinged and spring actuated to normally and resiliently hold the heating device in contact with the wind shield.

While my construction embodies broadly the idea of the heating element sliding over and conforming to the different shapes or forms of sleet, ice or snow accumulating upon a wind shield, and although this is accomplished through the medium of the semi-flexible support of the heating element and the resilient arms which are capable of flexion, I find that the sliding action over the ice can be further assisted by carrying the loops of the heating wire beyond the edges of the support and curving said loops outwardly or forwardly so as to form the generally arcuate prongs 27 as in Fig. 4, or the edges of the support as well as the loops of the heating wire may be curved outwardly or forwardly, as shown in Fig. 5. Also if found desirable, the heating wire may be located adjacent the edges of the support as indicated at 28 in Fig. 6 so as to form a border or boundary for the zig-zag portion of the heating element and the sections of the wire forming such border will assist the heating device in riding over lumps of ice even though the edges of the support and the looped ends of the wires are not curved.

Of course I do not wish to be limited to the exact details of construction as herein shown, as these may be varied within the limits of the appended claim without departing from the spirit of my invention.

Having thus fully described my invention, what I claim as new and useful is:—

In a device of the kind described, a flexible transparent support capable of flexing sufficiently to pass over ice encrustations formed upon the outer surface of a wind shield glass, a heating element of bare wire fixed directly against a face of said support whereby said support has a tendency to maintain the heating element in direct contact with the ice encrustations, and means carried by said support whereby the complete device may be attached to a wind shield wiper.

CHARLES KELLEY KNIGHT.